Figure 1:
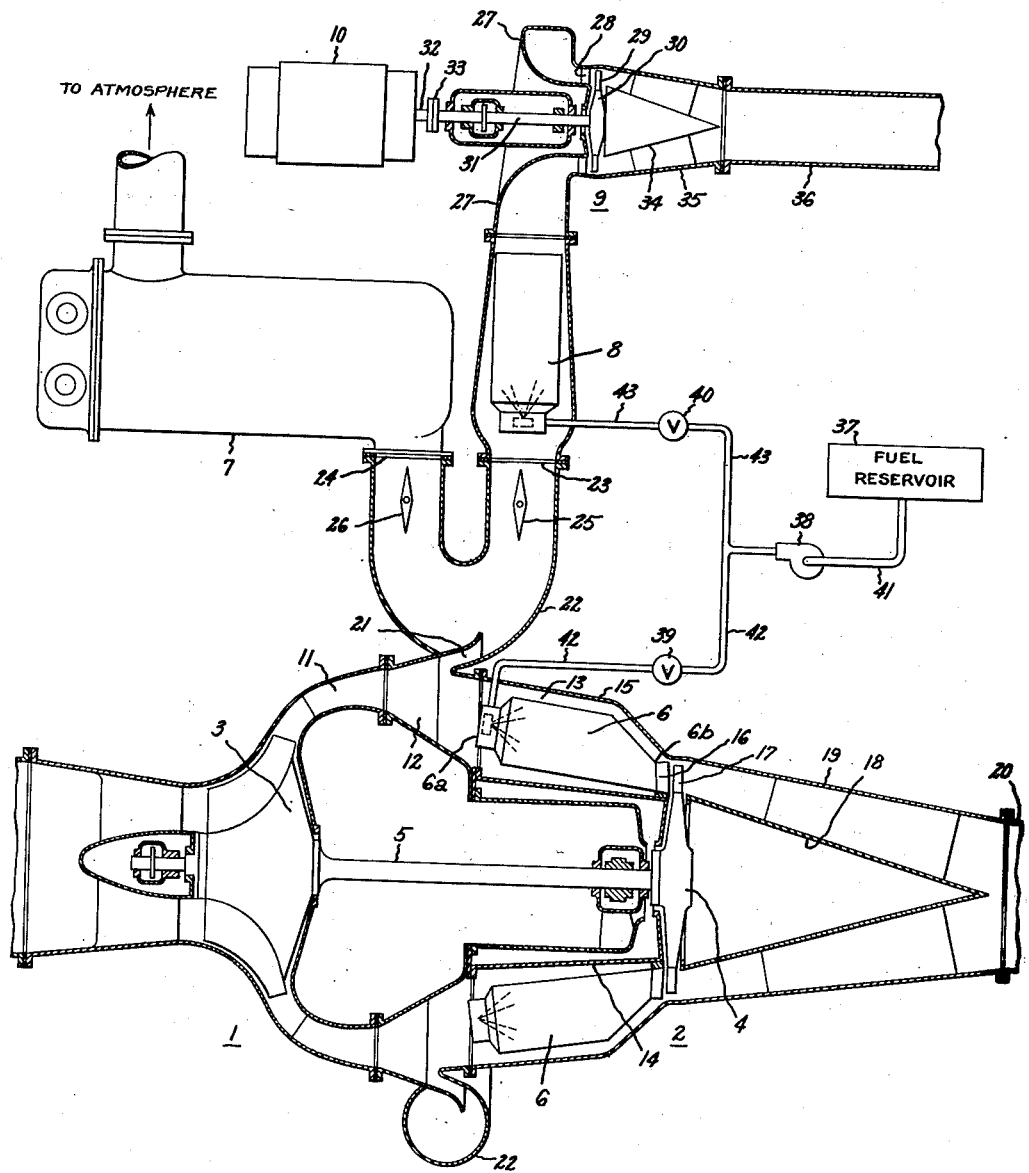

May 11, 1954     B. E. G. FORSLING     2,677,932
COMBUSTION POWER PLANTS IN PARALLEL
Filed Aug. 10, 1949     3 Sheets-Sheet 1

Inventor:
Bengt E. G. Forsling,
by *Prowell & Mack*
His Attorney.

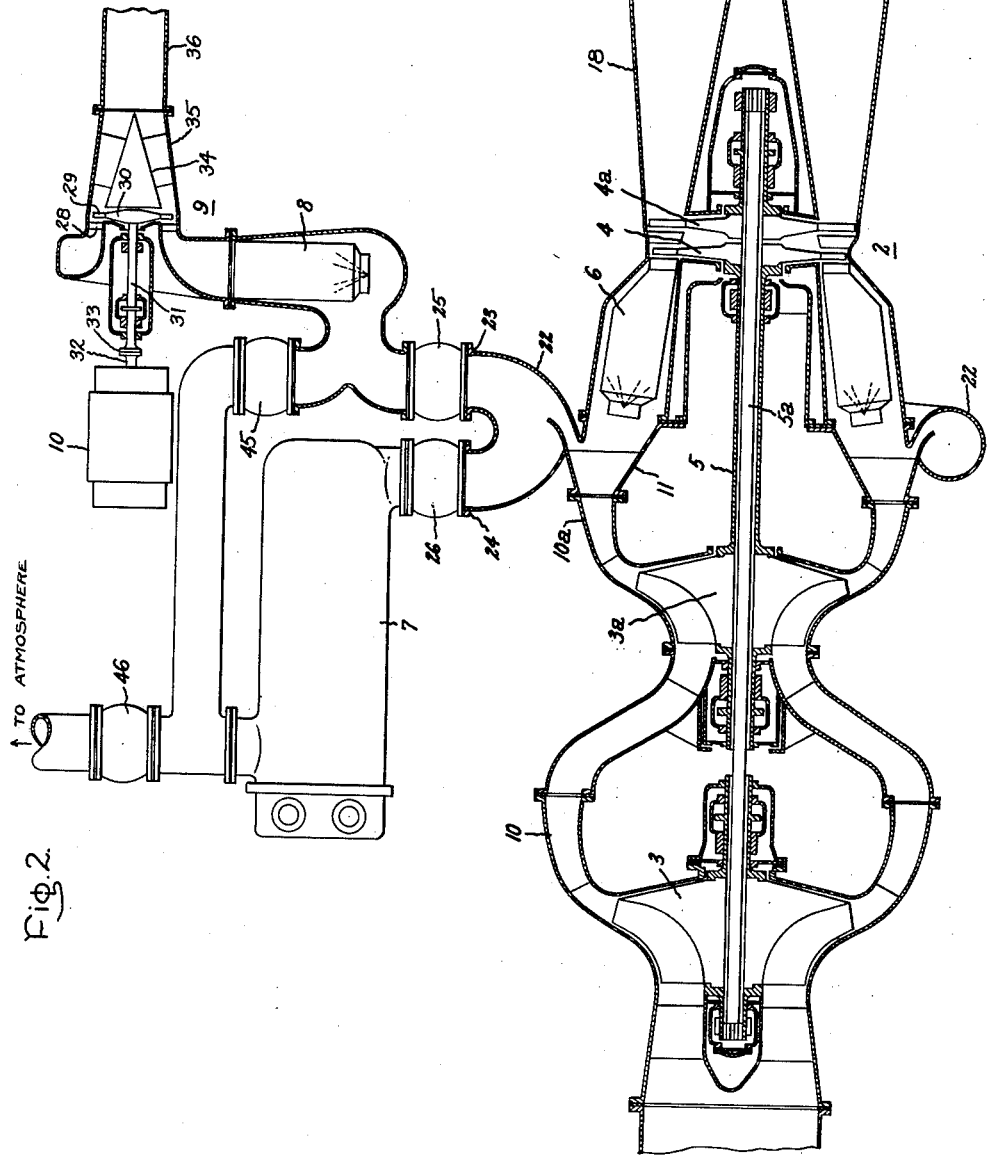

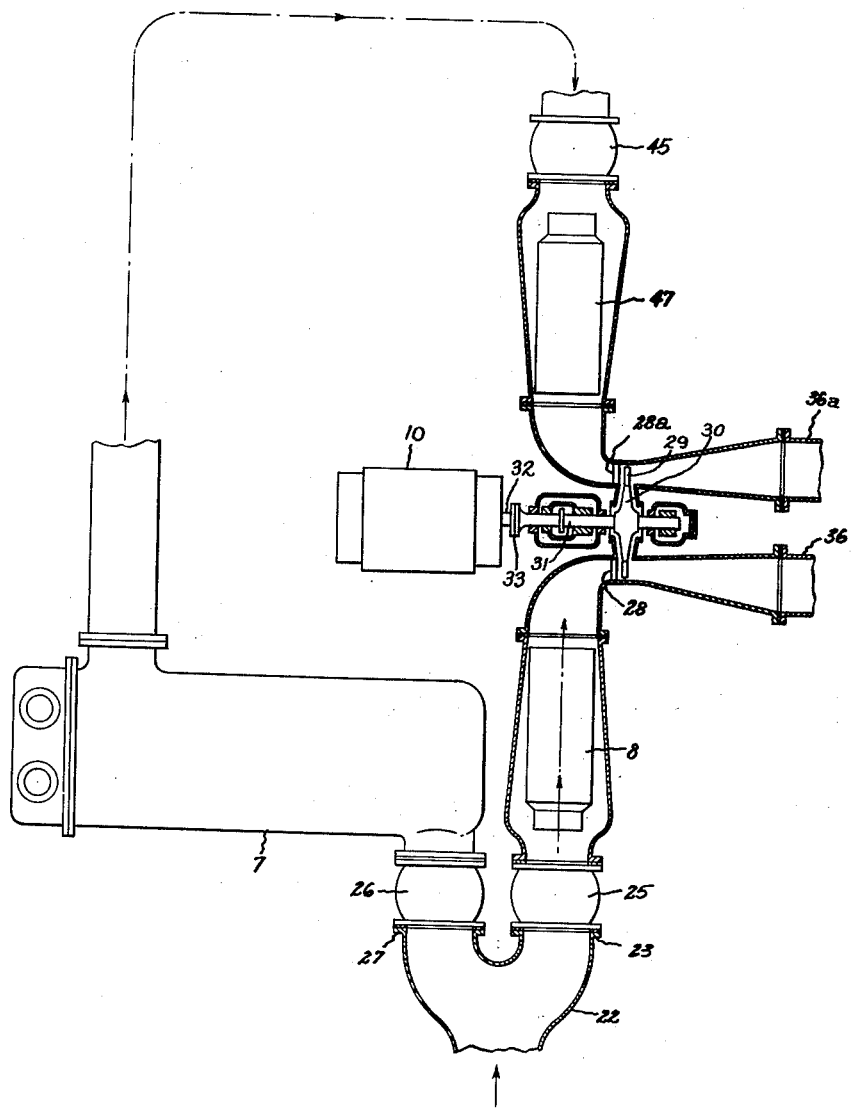

Patented May 11, 1954

2,677,932

UNITED STATES PATENT OFFICE 2,677,932

COMBUSTION POWER PLANTS IN PARALLEL

Bengt E. G. Forsling, Rugby, England, assignor to General Electric Company, a corporation of New York Application August 10, 1949, Serial No. 109,435

3 Claims. (Cl. 60—39.15)

This invention relates to a gas turbine powerplant particularly intended for driving the auxiliaries of an aircraft. It has been the usual practice to drive all auxiliaries for an aircraft from the powerplant through suitable gearing. According to previous practice, when electric power was required by the aircraft, direct current was furnished and supplied by a generator driven by the powerplant and electrically connected in parallel with batteries which provided current when the powerplant was not in operation. Certain aircraft auxiliaries have been developed which make it no longer possible to utilize direct current but instead require the use of alternating current for satisfactory operation. If alternating current is to be used, it is no longer possible to follow the previous practice for various reasons. One of these reasons is that, the alternator which furnishes the alternating current must run at a constant speed which is determined by the frequency employed, whereas the operational speed of the powerplant varies. Another important reason is that if the alternator were connected directly to the powerplant by suitable gearing, there would be no current supply when the powerplant is not in operation. It is therefore desirable to provide efficient and compact means for driving an alternator or other aircraft auxiliaries at a speed independent of the rotational speed of the powerplant and during periods when the powerplant is not in operation. In aircraft service, a comparatively high frequency alternating current is generally used of the order of perhaps four hundred cycles per second, operation is required at relatively high altitudes up to say 50,000 ft., and at the same time, the weight of the power supply must be minimized.

Under such conditions, a gas turbine is a suitable prime mover. The inherently low efficiency of a simple gas turbine cycle is partly compensated for by the low ambient air temperatures at such altitudes, and the low barometric pressures encountered at such altitudes is of no particular disadvantage in the capacities visualized for a powerplant of the type described. In fact, this may be an advantage because the output of the alternator is generally on the low side for obtaining good efficiencies with a gas turbine in spite of the lower ambient pressures at high altitudes.

Accordingly, it is an object of the invention to provide a gas turbine powerplant arrangement which obviates the above-mentioned difficulties.

It is also an object of the invention to provide a powerplant arrangement for driving powerplant auxiliaries such as an electrical generator or alternator at a speed independent of the rotational speed of the main powerplant.

A further object of the invention is to provide a powerplant arrangement wherein auxiliaries can be driven by the powerplant at a speed independent of the main powerplant and which at the same time provides a suitable source of pressurized air for use in any desired manner, for example, for cooling various portions of the powerplant, or for pressurization of aircraft cabins for high altitude service, for de-icing purposes, etc.

Other objects and advantages will be apparent from the following description taken in connection with the accompanying drawings in which Fig. 1 illustrates a simple embodiment of a gas turbine powerplant arranged in accordance with the invention and which is suitable for operation at moderate altitudes; Fig. 2 represents a modified embodiment of the invention suitable for operation at still higher altitudes; and Fig. 3 illustrates a further embodiment of the invention primarily intended for use at or near ground level and relatively low altitudes for relatively long periods of operation.

In the present invention the powerplant arrangement comprises a primary turbine arranged to drive a compressor, a secondary turbine for driving an electrical generator or alternator, and a compressor arranged to serve the triple purpose of supplying air to the combustion chambers of the primary turbine, to the secondary turbine, and to an air consumer for any additional use which may be desirable, such as, cabin supercharging, cooling of various portions of the powerplant, de-icing purposes, etc. Air discharged from the compressor and used for cabin supercharging or other purposes as indicated above may subsequently be led to a secondary combustion chamber where additional heat is added to it by the combustion of fuel after which the heated air is expanded through a secondary turbine. The combustion chamber or chambers for the secondary turbine are arranged so that they may be supplied with air not only from the supercharged cabin but also directly from the compressor discharge. In one embodiment the air from the cabin and the compressor respectively, is led to separate combustion chambers for the secondary turbine and these respective separate flows are kept as separate as practicable when passing through the turbine. In the latter arrangement, the air from the separate combustion chambers may be conducted to entirely separate sets of turbine nozzles for the secondary turbine.

The compressor may be of the two-stage semi-axial flow type with independently driven impellers and the primary turbine may also have two stages with independent rotors, the high pressure rotor driving the high pressure impeller and the low pressure rotor driving the low pressure impeller. As previously indicated, it may be desirable for the secondary turbine to drive not only a generator or alternator but other auxiliaries such as lubricating oil pumps, fuel pumps or other accessories pertinent to the operation of the powerplant.

Referring now to Fig. 1, a simple arrangement which is suitable for operation at moderate altitudes, say up to the order of 25,000 ft., and where the mass flow of air required for cabin supercharging is reasonably small, comprises a compressor 1 driven by a primary gas turbine 2, the compressor and turbine rotors 3, 4 being mounted on a common shaft 5. In addition to supplying air to primary hot gas generators 6 which furnish motive fluid for the primary turbine, the compressor 1 is arranged to supply air to an air consumer 7 for cabin supercharging, cooling, de-icing, or other desired purposes and to a secondary hot gas generator 8. This secondary gas generator furnishes motive fluid for driving a secondary gas turbine 9 which drives an aircraft auxiliary 10 such as an electric generator or alternator.

As illustrated in Fig. 1 the compressor is of the semi-axial flow type having a centrifugal impeller 3 and an annular diffuser 11. This type of compressor is particularly suitable for aircraft service since it has a satisfactorily high efficiency which is well maintained over a wide range of pressure ratios and over a wide range of mass flow particularly at low and medium pressure ratios. It is to be understood however that a centrifugal type or an axial flow type of compressor may be employed with equally good results. Although the compressor will normally be designed for operation at relatively high altitudes, the compressor is capable of efficient operation at ground level, before take-off, and periods when no air flow is required by the consumer 7. The diffuser 11 discharges into an annular intermediate casing 12 from which a major portion of the air delivered by the compressor is conveyed directly to a plurality of hot gas generators 6 arranged circumferentially within an annular space 13 formed between the inner and outer casing walls 14, 15 surrounding the common shaft 5. A portion of the air delivered by the compressor enters the hot gas generators 6 through openings 6a and the remaining portion enters through axially spaced openings (not shown) in the generator walls for cooling the hot gases to a temperature which the turbine can safely withstand.

The exit end portion 6b of the combustion chambers is narrowed down radially and extended circumferentially to fit a turbine nozzle ring 16 which directs the hot gas mixture produced in the combustion chambers 6 to blading 17 carried by the rotor 4 of primary turbine 2.

Exhaust gases are discharged from turbine 2 through an annular passage formed by inner and outer exhaust cones 18, 19. These gases then pass to an exhaust pipe 20 through which they are discharged to the atmosphere in a direction opposite to the direction of flight and at a velocity greater than that of the aircraft so that energy can be recovered from the gases in the form of a forward thrust.

Intermediate casing 12 is surrounded by an annular duct 21 leading to a scroll or collector casing 22 for extracting air for the secondary turbine 9 and for the air consumer 7. The collector casing has two outlets 23, 24 which are provided with control valves 25, 26. The control valves are either manually controlled or automatically operated in a manner to be described hereinafter. Air discharged from outlet 23 is conveyed to hot gas generator 8 and then passes through a suitable duct or casing 27 to a nozzle ring 28 of the secondary turbine 9. The nozzle ring 28 expands the hot gases received from hot gas generator 8 and directs these gases to turbine blades 29 carried by rotor 30 of the secondary turbine 9. Rotor 30 is secured to a shaft 31 which is in turn connected to another shaft 32 of an auxiliary such as an alternator 10 by any well known type of coupling means 33. Inner and outer exhaust cones 34, 35 and exhaust conduit 36 are provided for conducting the exhaust gases from the secondary turbine 9 to the atmosphere in a manner previously described in connection with the primary turbine 2.

The second outlet 24 of the collector casing is connected to the air consumer 7. For the purpose of illustration and not of limitation, the air consumer may be regarded as an aircraft cabin which is kept under pressure. After passing through the cabin the pressurized air is discharged to the atmosphere through suitable flow restricting means (not shown).

The fuel supply system comprises a fuel reservoir 37, fuel pump 38, valves 39, 40, and suitable conduit means connecting the fuel reservoir to the pump and then to the power plant. Fuel is conveyed from the reservoir 37 to the inlet of pump 38 by conduit 41. Fuel discharged by the pump is conveyed to the power plant by a branched conduit having branches 42, 43, which conduct fuel to hot gas generators 6, 8. The fuel supply to the primary hot gas generator 6 is controlled by valve 39 which is adjusted to maintain the rotational speed of secondary turbine 9 at a desired value and to maintain the desired pressure level at the air consumer 7. The fuel supply to the secondary hot gas generator 8 is controlled by valve 40 which is manipulated so as to keep either the inlet gas temperature or the exhaust gas temperature of secondary turbine 9 at a desired value.

As previously indicated, valves 25, 26 may be adjusted either manually or automatically. The power plant should be so designed that at the designed altitude, the secondary turbine will give the required output when the air pressure at the upstream side of hot gas generator 8 is at the same value as the cabin pressurizing air at outlet 24. Under these conditions, valve 25 will generally be fully open and valve 26 will be slightly closed.

Again referring to Fig. 1, the operation of the power plant is as follows: If the load on the secondary turbine is increased, the fuel supply to the primary hot gas generator 6 must be increased by adjustment of valve 39. The speed of the compressor turbine 2 is thus increased thereby increasing the mass flow of air through the compressor, as well as the compressor discharge pressure. As previously indicated, valves 25, 26 may be adjusted manually, or if desired may be automatically controlled. In either event and assuming that the flow requirements of the air consumed remain constant, valve 25 is caused to open as the compressor discharge pressure is increased thereby increasing the mass flow to the secondary hot gas generator 8. After valve 25 reaches its fully open position, valve 26 must be caused to close with further increases in compressor discharge pressure in order to maintain a constant mass flow to the air consumer 7. The increase in mass flow to the secondary hot gas generator 8 will cause an increase in the air-fuel ratio thereby causing secondary turbine 9 to operate at a reduced inlet temperature if the rate of fuel flow to the secondary generator remains at its former value. However, since the efficiency of a gas turbine increases with increasing temperature level, it is desirable to adjust valve 40 to increase the rate of fuel flow to the secondary hot gas generator so as to operate turbine 9 at the highest temperature level commensurate with the desired life expectancy of the turbine materials. Greater output of the secondary turbine to accommodate the increased load is thus obtained by an increase in mass flow, pressure ratio, and temperature in combination. If it is desired to reduce the load on the secondary turbine, valve 39 is adjusted to reduce the fuel supply to the primary hot gas generator 6, which reduces the compressor discharge pressure. Valve 26 is opened to maintain constant air flow to the consumer 7. After valve 26 is fully open, valve 25 is closed in accordance with the reduced air flow from the compressor, and valve 40 is also closed to reduce the fuel flow to the secondary hot gas generator 8 to prevent operation of turbine 9 at excessive temperatures.

If the mass flow required by consumer 7 is altered, the fuel supply to the hot gas generator for the primary turbine is increased or decreased, as is appropriate by adjusting valve 39. Pressure at the discharge of the compressor and the mass flow through the primary turbine are thereby increased or reduced to meet the new power requirements of the compressor. The two valves 25, 26 in the outlets of the collector casing 22 then are operated in such a way that the mass flow through valve 25 to the secondary turbine 8 remains the same, but the mass flow through valve 26 is adjusted to meet the new requirements for cabin supercharging.

At ground level and at lower altitudes when cabin supercharging is not required, the valve 26 remains in its closed position and valve 25 is fully opened. The power plant may then be regarded as a simple gas turbine with two turbines operating in parallel, one driving the compressor and the other producing the net output. Under these conditions, the two turbines operate at a low pressure ratio which gives a relatively high fuel consumption. As the aircraft climbs, the pressure before and after the turbine is reduced, but the inlet pressures are reduced more slowly than the exhaust pressure, so that the pressure ratio is gradually increased with altitude. The increase in pressure ratio must compensate for the loss in power due to reduced gas flow if the load remains the same. Improved performance at ground level and at low altitudes can be achieved by providing a valve (not shown) for shutting off the gas supply to part of the nozzle ring 28 of the secondary turbine.

If a power plant of the type described is intended for service at altitudes between approximately 25,000 and 40,000 ft., the pressure ratio required to maintain a described cabin pressure may become so great that a single stage compressor is not suitable since the losses involved in discharging cabin supercharging air at relatively high pressure to the ambient atmosphere may become too great to be tolerated. A modified power plant arrangement suitable for such conditions is generally similar to the arrangement already described, except that the cabin supercharging air is led to the hot gas generator for the secondary turbine after passing through the cabin, and a two-stage arrangement of the primary turbine and compressor is employed. In the usual two-stage design of compressors in which both impellers are secured to the same shaft, one stage is always overloaded and the other underloaded when the compressor is operated at pressure ratios other than at the design value even when the volume of air flow per unit of time is in the same ratio to the rotational speed as at the design point.

Accordingly, the compressor and primary turbine arrangements are modified as follows:

Referring to Fig. 2, the compressor-turbine arrangement shown is again of the semi-axial flow type, but comprises two impellers, a low pressure impeller 3 with a diffuser 10 and a high pressure impeller 3a and diffuser 10a connected in series, so that the air leaving the low pressure diffuser 10 enters the high pressure impeller 3a. The high pressure diffuser 10a is connected to an annular intermediate casing 11 which in turn is connected to the hot gas generator 6 for the primary turbine 2 and to a collector casing 22 leading to the hot gas generator 8 for the secondary turbine 9 and the consumer 7, as in the above-described embodiment.

The primary turbine 2 is also divided into two stages operating in series. Turbine rotors 4, 4a are coaxial and may be contra-rotating. The high pressure rotor 4 is secured to a hollow shaft 5 which is in turn secured to the high pressure impeller 3a. The low pressure turbine rotor 4a is mounted at one end of a shaft 5a which rotates within hollow shaft 5 and the low pressure impeller 3 is secured to the other end of the shaft.

As already indicated, the secondary turbine and consumer arrangement are generally similar to those described in connection with Fig. 1 except that the air which passes through the consumer 7 is led through a valve 45 to the hot gas generator 8 for the secondary turbine instead of being discharged to the atmosphere. Thus, the collector casing 22 again has two valve-controlled outlets 23, 24, one of which is connected to hot gas generator 8 and the other to the air consumer 7. However, in this embodiment of the invention, the air leaving the consumer 7 is conducted back to the secondary hot gas generator 8. Again regarding consumer 7 as a pressurized aircraft cabin for the purpose of illustration and not of limitation, a valve 46 is provided, if desired, whereby air may be discharged from the cabin directly to the atmosphere. Therefore, in this embodiment of the invention, four valves have to be considered, a valve 25 between the collector casing 22 and the secondary hot gas generator 8, a valve 26 between the collector casing and the cabin, a valve 46 between the cabin and the atmosphere, and a valve 45 between the cabin and the secondary hot gas generator. If desired, suitable automatic control may be provided for controlling fuel flow to the hot gas generators and for automatic positioning of the above-mentioned valves, or adjustment of the various valves may be effected manually.

At the design altitude, valve 26 between the collector casing 22 and the cabin is normally fully open. Valve 45 between the cabin and hot gas generator 8 is set to give the required air flow through the cabin.

The fuel supply system is as shown in Fig. 1 and is not shown in Fig. 2 in the interest of clarity. The fuel supply to the primary hot gas generator 6 and the opening of valve 25 between collector casing 22 and the secondary gas generator 8 are controlled in accordance with the speed of secondary turbine 9 and the cabin pressure. After valve 25 is fully closed and it is desired to further reduce the load on the secondary turbine, valve 45 between the cabin and the secondary hot gas generator 8 is closed until the output of turbine 9 falls to the desired value. At the same time, valve 46 between the cabin and atmosphere is opened. Opening of valve 46 and the operation of the valve 45 will be required mainly in the case of emergency.

At ground level and at low altitudes when cabin supercharging is not required, valve 26 between the collector casing 22 and the cabin and valve 45 between the cabin and the secondary hot gas generator 8 are fully closed, and valve 25 between the collector casing and the secondary gas generator is fully open. Under these conditions, the power plant operates as a simple gas turbine unit comprising two turbines, one driving the compressor and the other providing the net output. Since the pressure ratio is again low, the fuel consumption per kilowatt hour is relatively high.

A still further modification of the invention is illustrated in Fig. 3, and this embodiment is intended for use where the power plant has to operate at ground level and lower altitudes for prolonged periods. The primary turbine and compressor may be of any suitable type, for example, as described in either of the foregoing embodiments. The secondary turbine and cabin supercharging arrangements are however modified from those described in the second embodiment, in that the air conveyed from the cabin to the secondary turbine does not enter the secondary gas generator 8 but is conveyed to a third gas generator 47. Gas generators 8, 47 furnish hot gas to separate nozzle rings 28, 28a so that the two flows are not mixed. The secondary turbine is provided with separate exhaust ducts or pipes 36, 36a so that the two flows are kept substantially apart until they are finally exhausted to the atmosphere.

When operating at ground level and at low altitudes when cabin supercharging is not used, the valve 26 between the collector casing 22 and the cabin and valve 45 between the cabin and gas generator 47 are closed, and valve 25 is fully open. Under these conditions, the hot gas supplied by the gas generator 8 can reach only nozzle ring 28. In order to pass sufficient gas to generate the required power output, the pressure of the gas must be increased. The pressure ratio across the turbine, in other words, is increased by using partial arc admission when cabin supercharging is not required, and in order to obtain good exhaust flow conditions during partial arc admission, the separate exhaust pipes 36, 36a are provided.

While particular embodiments of the invention have been illustrated and described, it will be obvious to those skilled in the art that various changes and modifications may be made without departing from the invention, and it is intended to cover in the appended claims all such changes and modifications that come within the true spirit and scope of the invention.

What I claim as new and desire to secure by Letters Patent of the United States is:

1. Energy converting apparatus comprising a compressor having inlet and discharge passages, first and second hot gas generating means connected in parallel flow relation to said compressor discharge passage, a first turbine connected in series flow relation to said first gas generating means and connected in driving relation to the compressor, a second turbine adapted for operation at rotational speeds independent of the rotational speeds of the first turbine and connected in series flow relation to said second gas generating means, fluid consuming means having an inlet opening connected to the compressor discharge passage and in parallel flow relation with said gas generating means, and valve means at a location between the compressor discharge and the inlet to said second gas generating means and between said compressor discharge and said fluid consuming means for varying the relative proportions of the compressor flow received by said first and second gas generating means and said fluid consuming means, and conduit means connecting said fluid consuming means in series flow relation with said second gas generating means at a location between the inlet to said second generating means and the downstream side of the valve means controlling the flow thereto, and bypass means connected to said fluid consuming means for directing the flow to the atmosphere.

2. Energy converting apparatus including a compressor having at least two separate rotor elements connected in series flow relation and having inlet and discharge passages, first and second hot gas generating means connected in parallel flow relation to said compressor discharge passage, a first turbine connected in series flow relation to said first gas generating means, said turbine having at least two separate rotor elements connected in series flow relation and having co-axial shafts each secured at one end to one of the turbine rotor elements, each of said co-axial shafts being secured at the other end to one of the compressor rotor elements in driving relation and rotating freely of each other, a second turbine adapted for operation at rotational speeds independent of the rotational speeds of either of said turbine shafts and connected in series flow relation to said second gas generating means, a fluid consumer having inlet and discharge connections, the inlet connection of said consumer being connected to the compressor discharge passage and in parallel flow relation with said second gas generating means, valve means for varying the relative proportions of the compressor flow received by said first and second gas generating means and said fluid consumer at locations between the compressor discharge and the inlet to said second gas generating means and between said compressor discharge and said fluid consumer, and conduit means connecting the discharge connection of said consumer in series flow relation with said second generating means at a location between the inlet to said second gas generating means and the downstream side of said valve means controlling the flow thereto, and bypass means connected to said fluid consuming means for directing the flow to the atmosphere.

3. Energy converting apparatus including a compressor having at least two separate rotor elements connected in series flow relation and having inlet and discharge passages, first and second hot gas generating means, conduit means connecting said gas generating means in parallel flow relation and in series with said compressor discharge passage, a first turbine having at least two separate rotor elements connected in series flow relation and having co-axial shafts, each of said co-axial shafts being connected to one of the compressor rotor elements in driving relation and rotating freely of each other, conduit means connecting said first turbine in series flow relation to said first gas generating means, a second turbine adapted for operation at rotational speeds independent of the rotational speeds of either of said turbine shafts, conduit means connecting said second turbine in series flow relation to said second gas generating means, a fluid consumer having inlet and discharge connections, conduit means connecting the inlet connection of said consumer to the compressor discharge passage and in parallel flow relation with said first and second gas generating means, flow control means including valves at locations between the compressor discharge and the inlet of said second gas generating means and between said compressor discharge and said fluid consumer, and conduit means including a valve therein connecting the discharge connection of said consumer in series flow relation with said second generating means and at a location between the inlet to said second gas generating means and the downstream side of the valve controlling the flow thereto, and bypass means connected to said fluid consuming means for directing the flow to the atmosphere.

References Cited in the file of this patent

UNITED STATES PATENTS

| Number | Name | Date |
|---|---|---|
| Re. 23,198 | Anxionnaz | Feb. 21, 1950 |
| 2,085,761 | Lysholm | July 6, 1937 |
| 2,243,467 | Jendrassik | May 27, 1941 |
| 2,280,765 | Anxionnaz et al. | Apr. 21, 1942 |
| 2,371,889 | Hermitte | Mar. 20, 1945 |
| 2,372,686 | Sédille | Apr. 3, 1945 |
| 2,409,177 | Allen et al. | Oct. 15, 1946 |
| 2,427,845 | Forsyth | Sept. 23, 1947 |
| 2,430,399 | Heppner | Nov. 4, 1947 |
| 2,477,184 | Imbert et al. | July 26, 1949 |

FOREIGN PATENTS

| Number | Country | Date |
|---|---|---|
| 493,174 | Great Britain | Oct. 14, 1938 |
| 583,500 | Great Britain | Dec. 19, 1946 |
| 398,932 | France | Apr. 6, 1909 |